United States Patent Office 3,554,845
Patented Jan. 12, 1971

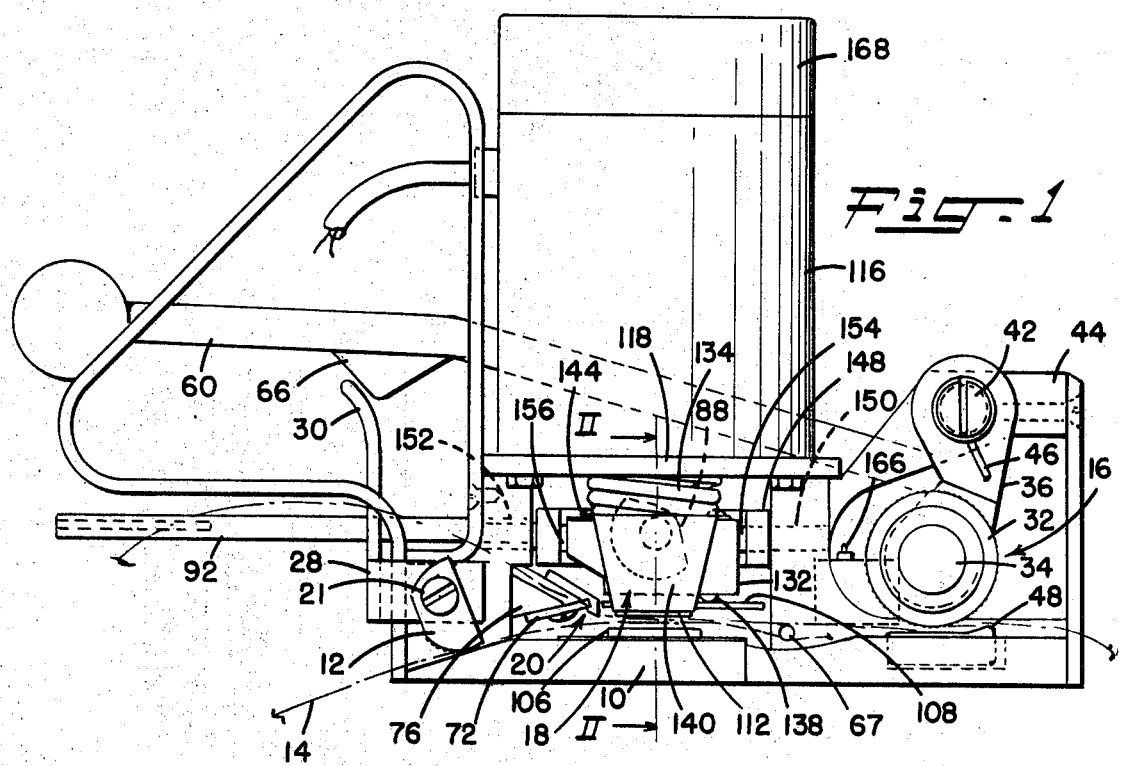
Fig. 1
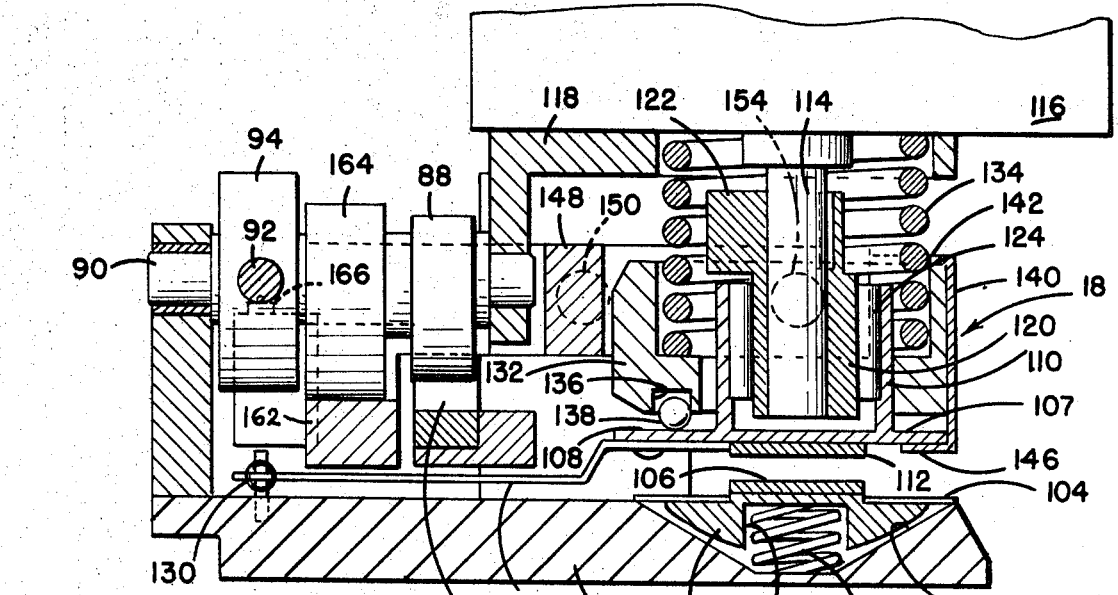
Fig. 2
Fig. 6

3,554,845
FRICTION WELDING OF PLASTIC STRAPPING
Ronald J. Billett, Sunnyvale, and Terence H. West, San Jose, Calif., assignors to FMC Corporation, Philadelphia, Pa., a corporation of Delaware
Filed Nov. 17, 1967, Ser. No. 683,943
Int. Cl. B32b 31/00; B23k; B29c 27/00
U.S. Cl. 156—580          3 Claims

ABSTRACT OF THE DISCLOSURE

A method and apparatus for securing together overlapping ends of plastic strapping by means of frictional heat developed at the interfaces of the overlapping ends. The apparatus involves means for tensioning a length of strapping about an object, means for severing the tensioned strap from a supply, means for pressing overlapping end portions of the tensioned strap together and means for rubbing one of the ends against the other with an orbital motion.

---

This invention relates to an improved method and apparatus for frictionally welding together overlapping ends of plastic strapping. The term "plastic strapping" as used herein applies to a high strength, molecularly oriented, polymeric strapping used for binding bundles, boxes, bales and the like after the manner of steel band strapping.

Securing plastic pieces together by rubbing one against another with sufficient pressure and speed to develop enough heat to slightly melt or soften the rubbed together areas and then continuing to press them together until they fuse is well-known, being commonly referred to as friction welding. Such method is described generally in an article entitled "Fabrication by Friction" appearing in the December 1945 issue of Plastics Magazine beginning on page 64. Securing cylindrical pieces such as rods and pipes presents no great difficulty in that it is merely necessary to produce relative rotation or oscillation of the pieces about their aligned longitudinal axes. It is also known to produce a friction weld between overlapping ends of plastic strapping by reciprocating one of the ends in a direction longitudinal of the strap while pressing it against the other end which is held stationary. The method of the present invention differs from the prior art of friction welding plastic strapping primarily in that a novel motion is imported to one of the strap ends and the apparatus provides a highly advantageous arrangement for carrying out the strapping operation.

It is an object of the invention to provide an improved method of friction welding overlapping ends of plastic strapping which is tensioned about an object.

It is a further object of the invention to provide an improved apparatus for tensioning a length of plastic strapping about an objection and securing overlapping end portions thereof by friction welding.

Other and further objects, features and advantages of the invention as well as the means for attaining the same will become apparent as the description of a preferred embodiment thereof proceeds.

Figure 3:
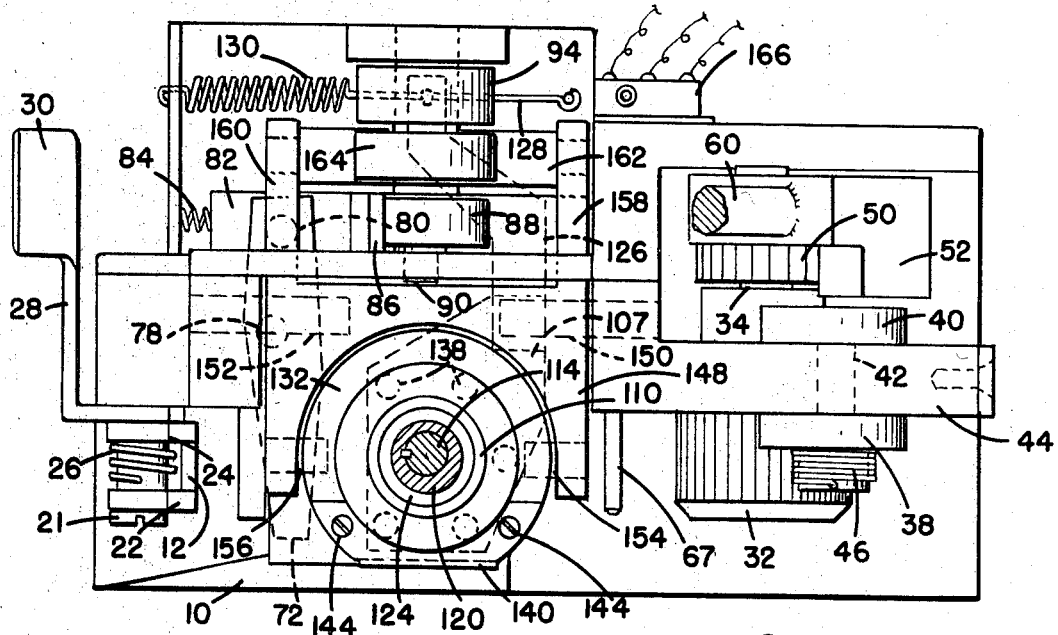
Figure 4:
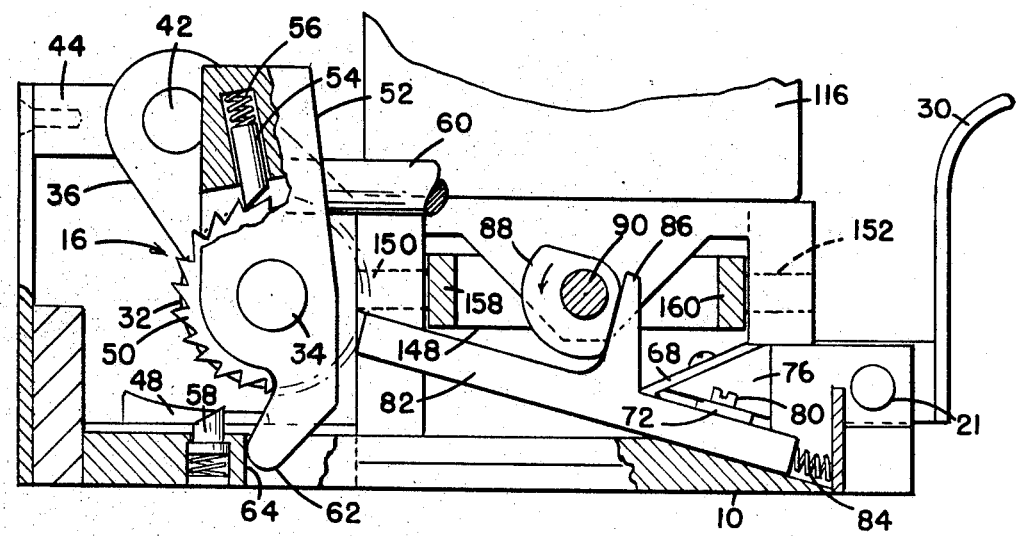
Figure 5:
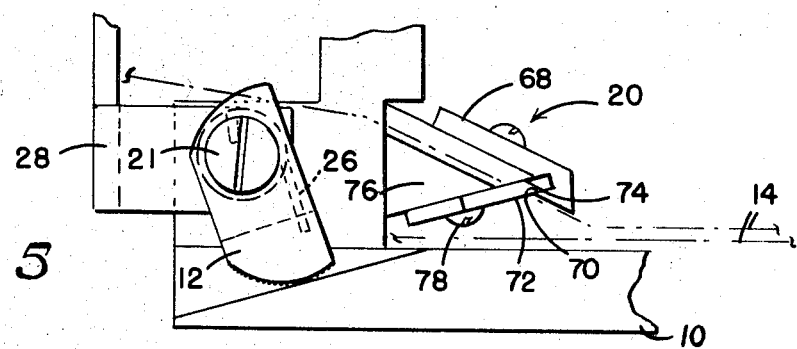

Referring now to the drawing:
FIG. 1 is a side elevational view of the apparatus;
FIG. 2 is an enlarged sectional view taken along the line II—II of FIG. 1;
FIG. 3 is a view partially in section and partially in plan of a portion of the apparatus;
FIG. 4 is a sectional view showing the tensioning and cutting mechanism of the apparatus;
FIG. 5 is an enlarged side elevational view of a portion of the apparatus; and FIG. 6 is a diagrammatic plan view of overlapping strap ends which will be used in describing the motion imparted to one of the ends.

The apparatus is shown in the form of a tool comprising a base 10 adapted to rest upon the object about which the strapping is to be tensioned and secured. The various operating parts are secured either directly or indirectly to the base and include a dog 12 having a serrated edge adapted to co-operate with a portion of the base 10 to grip and hold one end portion of the plastic strapping 14. A tensioning mechanism indicated generally at 16 is adapted to act upon a portion of the strapping to draw the same tight about the object to be bound and provide overlapping strap portions beneath a sealing head indicated generally at 18. There is a cutter indicated generally at 20 for cutting the tensioned strap loop from the strap supply at a point closely adjacent the sealing head.

The lower serrated edge of holding dog 12 is as wide or wider than the strap with which the tool is intended for use and said dog is pivotally mounted on a pin 21 which extends through aligned openings in a pair of ears 22 and 24 (see FIG. 3) of the dog. A torsion spring 26, one end of which is secured to pin 21, urges the dog in a direction to engage the serrated edge thereof against the base 10 or against the strap when the strap is positioned between the dog and the base. Secured to or formed integrally with dog 12 is a lever 28 which has an operating portion 30 whereby the dog may be rocked counterclockwise as viewed in FIG. 1 against the action of spring 26 to facilitate insertion of the strap beneath the dog.

The tensioning mechanism 16 comprises a strap engaging tensioning wheel 32 secured to a shaft 34 rotatably mounted in and extending through one end of a link 36. The other end of link 36 is bifurcated to provide a pair of ears 38 and 40 (see FIG. 3) by means of which said link is pivotally mounted on a shaft 42 secured in a fixed support 44. A torsion spring 46 surrounds shaft 42 and has one end secured to said shaft and other end secured to or bearing against link 36 whereby said link is urged in a direction to engage wheel 32 with a shoe 48 mounted in base 10.

As best seen in FIGS. 3 and 4, a ratchet wheel 50 is secured to shaft 34 on the opposite side of link 36 from tensioning wheel 32 and pivotally mounted on said shaft adjacent the ratchet wheel is a member 52 carrying a plunger 54 which is urged by a spring 56 into engagement with the teeth of the ratchet wheel. The plunger 54 has a sloped bottom end whereby when member 52 is rocked counterclockwise, the plunger imparts rotation to ratchet wheel 50 and when said member is rocked clockwise the plunger is moved upward by the teeth of the ratchet wheel against the action of spring 56 and does not actuate the ratchet wheel. In FIG. 4, link 36 is shown in a rocked position wherein tensioning wheel 32 is elevated above shoe 48, as will presently be explained, but when the link is rocked to its normal position wherein the tensioning wheel engages the shoe, the ratchet wheel 50 is in contact with a spring urged detent 58 mounted in base 10. Detent 58 prevents retrograde rotation of the ratchet wheel and tensioning wheel when member 52 swings clockwise.

A lever 60 is secured to member 52 whereby said member may be oscillated about shaft 34. Member 52 has an extension or nose 62 on its lower end which fits loosely within a slot provided in base 10. Normal oscillation of lever 60 causes ratchet wheel 50, shaft 34 and tensioning wheel 32 to rotate in a clockwise direction as viewed in FIG. 1 (counterclockwise as viewed in FIG. 4). The tensioning wheel has a knurled, serrated or other strap gripping surface whereby when the wheel is in contact with strap 14, rotation of the wheel causes the strap to slide over the shoe 48 and be tightened about the object around which it is looped. As previously mentioned, the tensioning wheel 32 is normally held in FIG. 1 position by spring 46. Movement of lever 60 counterclockwise from the position shown in FIG. 1, brings nose 62 of member 52 into contact with a ledge 64 of base 10 (see FIG. 4) and pressure of the nose against the ledge causes link 36 to rock against the action of spring 46 whereby tensioning wheel 32 is lifted out of contact with shoes 48 or the strap which may be located between the wheel and the shoe. This extreme movement of lever 60 also brings a cam 66 provided on the lever into contact with operating portion 30 of lever 28 whereby dog 12 is rocked out of engagement with the base 10.

The hereinbefore described mechanisms are fairly conventional and may be varied considerably if desired. When the tool is to be put into operation, lever 60 is depressed to lift holding dog 12 and tensioning wheel 32. An end portion of the strap 14 is slipped beneath a fixed pin 67, beneath the sealing head 18 and under the serrated end of holding dog 12. The strap is then looped about the object to be bound and a portion thereof is slipped beneath tensioning wheel 32, beneath sealing head 18 in overlapping relationship with the end portion of the strap and through the cutter 20. From cutter 20 the strap extends to a supply, not shown. Operation of lever 60 is then effective to permit dog 12 to grip the end portion of the strap and tensioning wheel 32 to engage that portion of the strap located therebeneath. Preferably, the operating portion 30 of the dog actuating lever 28 is so arranged with respect to cam 66 that a slight relaxing of lever 60 permits dog 12 to engage and grip the strap while tensioning wheel 32 is still maintained in its elevated position. This facilitates the lacing of the strap. Oscillation of lever 60 then causes the tensioning wheel to draw the strap tight. Thus overlapping portions of the tightened strap are provided beneath sealing head 18 but those portions of the strap directly beneath the sealing head are not themselves under tension.

Cutter 20 is best shown in FIGS. 3, 4 and 5. The cutter operates with a scissors action and comprises a fixed blade 68 having a cutting edge 70 and a blade 72 having a cutting edge 74. Blade 72 is pivotally mounted intermediate its length on a wedge shaped member 76 by means of a screw 78 or the like. Near the end opposite the cutting edge 74, blade 72 is pivotally connected as by means of a screw 80 to a slidably mounted member 82. Member 82 is normally urged to the position shown in FIG. 4 by a spring 84 and in this position of the member, blade 72 is rocked about its pivot 78 so as to move the cutting edge 74 away from the cutting edge of fixed blade 68 whereby the strap may be slipped between the cutting edges. In this normal position of member 82 an upstanding arm 86 thereof bears against a low portion of a cam 88. Cam 88 is secured to a shaft 90 which as shown in FIG. 2 is rotatably supported in fixed portions of the tool framework. An operating lever 92 extends from a collar 94 secured to shaft 90 whereby said shaft may be rotated to a position wherein the high portion of cam 88 engages the arm 86 and moves slide 82 against the action of spring 84. This movement of slide 82 is effective to rock cutter blade 72 about its pivot 78 whereby the strap is severed by the cutting edges 70 and 74. As will be seen in FIG. 1 the strap is cut from the supply at a point closely adjacent sealing head 18.

Referring now particularly to FIG. 2; a frusto-conical recess 96 is provided in the base 10 directly beneath sealing head 18. An anvil member 98 has a spherical segment extending into recess 96 and a compression spring 100 fits into a socket 102 in the bottom of the anvil member and bears against the base of the frusto-conical recess. A retainer ring 104 secured as by means of screws or the like to base 10 overlies a portion of the anvil member and prevents the same from being ejected from the recess by spring 100. The top of the anvil member is provided with strap engaging means in the form of a pad 106 and the lower end of the strap 14, that is that portion extending between dog 12 and pin 66, rests directly on the anvil pad.

The sealing head 18 comprises a device 107 having a flat bottom portion 108 and a cylindrical portion 110 extending upwardly from the central area of the bottom portion. Secured to the underside of the portion 108 is a strap engaging means or pad 112. Pad 112 lies directly above the upper portion of the strap 14 closely adjacent cutter 20 (see FIG. 1). As will presently be explained in detail, device 107 is movable toward and away from anvil 98 so as to squeeze overlapping portions of the strap 14 between the pads 106 and 112. Pressure of the device 107 against the strap compresses spring 100 whereby the spherical bottom of anvil member 98 seats firmly against the side of recess 96. The manner of mounting the anvil member permits it to tilt slightly before seating in the event that the strap cross section is not uniform or to correct for any small angular misalignment between the planes of pads 106 and 112, thus assuring good contact between the facing areas of the overlapping strap portions.

As will be explained in detail later, while the strap portions are being pressed together, device 107 is operated in a manner as to cause the upper strap portion to slide on the lower strap portion to produce sufficient frictional heat as to cause the overlapping strap portions to fuse together. Therefore, the strap engaging means or pads 106 and 112 are of such character that resistance to slipping between them and the strap is greater than the slipping resistance between the squeezed together strap portions. A preferred form of plastic strapping for use with the tool of the present invention is polypropylene and when the tool is to be used with this kind of strapping it has been found to be advantageous to form pads 106 and 112 of a polyurethane elastomer. A suitable elastomer is Armstrong Urethane Elastomer (PO–650) of 81 Shore A durometer hardness. With other types of plastic strapping, pads 106 and 112 may be formed of other materials and in some cases may be metal with roughened or spiked surfaces or may be comprised of metal spikes embedded in an elastomer.

The cylindrical portion 110 of the device 107 forming part of sealing head 18 has extending thereinto the lower end of the drive shaft 114 of a suitable motor 116 which is mounted upon a bracket 118 carried by the base 10. A sleeve 120 is secured to drive shaft 114 for rotation therewith. The lower end of sleeve 120 has a cylindrical outer surface which is eccentric or off-center with respect to the drive shaft. To balance the eccentricity of the lower end of the sleeve, the upper end thereof is provided with a counterweight portion 122. While the cylindrical outer surface of the lower end of sleeve 120 is eccentric with respect to the drive shaft it is concentric with the cylindrical portion 110 of device 107. Anti-friction bearing means, for example a needle bearing 124 is mounted between cylindrical portion 110 of the device 107 and the sleeve 120. Bearing 124 is capable of some movement longitudinally of the sleeve. Loosely surrounding the cylindrical portion 110 of device 107 is a collar member 132 and a heavy compression spring 134 has its lower end fitted within and bearing against said collar member. At its upper end spring 134 bears against the bottom of motor 116. Located within sockets 136 provided in the bottom of collar member 132 is a series of balls 138 which engages the upper face of the flat bottom portion 108 of the device 107. Only one ball 138 is shown in FIGS. 1 and 2 but actually there is a series of them spaced about the center line of cylindrical portion 110. Five such balls are shown in dotted lines in FIG. 3. A retainer 140 has an upper flange 142 secured to the upper edge of collar member 132 as by means of screws 144 and a lower flange 146 extending beneath an edge of the device 107 whereby said device is normally held in a position to retain the balls 138 in their sockets 136. Without the retainer 140, the cylindrical portion 110 of device 107 could slip down on or with the bearing 124 and permit balls 138 to escape.

Means is provided to prevent device 107 from rotating about the axis of sleeve 120 and constrain said device to an orbital motion with the axis of the drive shaft 114 at the center of motion. This means includes a member 126 secured at one end to the bottom portion 108 of device 107 and at the other end said member has connected thereto a wire 128 and a spring 130, best seen in FIG. 3. Wire 128 and spring 130 are anchored to the tool framework and permit the end of member 126 to have only a limited amount of universal movement. Thus member 126 and device 107 are permitted to move as the eccentric sleeve 120 is rotated by the drive shaft 114 but device 107 can only move with an orbital motion which has the centerline of drive shaft 114 at its center. The effect of this movement of device 107 upon the strapping will now be explained by reference to FIG. 6.

The pad 112 of course moves in the same manner as the bottom portion 108 of device 107 and in FIG. 6 that portion of the strapping which is in contact with and frictionally held by pad 112 is designated 14' while that portion of the strapping which is pressed against pad 106 is designated 14". Orbital motion of pad 112 causes the strap portion 14' to move so that a point A on the approximate longitudinal center line of this portion of the strapping orbits about a point B approximately on the longitudinal center line of the portion 14". This also causes all other incrementally spaced points on the portion 14' to orbit about correspondingly incrementally spaced points on the strap portion 14". Thus strap portion 14' does not actually orbit about portion 14" inasmuch as the two portions are alway substantially aligned but portion 14' is moved in such a manner that a point on its center line orbits about a point on the center line of portion 14". The actual amount of movement of strap portion 14' may be quite small. Thus, in the case of a polypropylene strap, it has been found that satisfactory welds may be produced in about two seconds when point A of strap portion 14' is moved through a path of about $\frac{1}{32}$ inch radius at a speed of 9500 r.p.m. with the strap portions under a pressure of about 200 pounds per square inch. This method of manipulating the strap portion 14' has great advantages over a reciprocating movement in that the motion is continuous rather than stop and go. The orbital motion can therefore accomplish its objective quicker and as a result heat migration into the body of the strap is minimized. It should be mentioned that it is desirable to confine the heat to the immediate vicinity of the seal inasmuch as molecular orientation and strap strength is lost when elevated temperatures are encountered. Furthermore, because the motion is continuous, wear on the drive mechanism is substantially reduced.

As previously mentioned, device 107 is movable toward and away from the anvil 98. Its normal position is away from the anvil and this position is shown in FIGS. 1 and 2. The mechanism for controlling this toward and away movement will now be explained.

A shifter member 148 is pivotally mounted on a pair of horizontal pins 150 and 152 carried by the framework of the tool. The shifter member has a semicircular portion best seen in FIG. 3 partially surrounding the collar member 132 and is articulated to the collar member by a pair of pins 154 and 156. A pair of arms 158 and 160 extend from the main body of the shifter member and a cam follower 162 is secured to the ends of said arms. Cam follower 162 underlies a cam 164 secured to the hereinbefore mentioned shaft 90 between cam 88 and collar 94. With shaft 90 in its normal position, a high portion of cam 164 holds follower 162 down to thereby hold shifter member 148 rocked about the pins 150 and 152 whereby collar member 132 is held up against the action of spring 134. Thus, cam 164 is effective to hold the sealing head 18 in its upper position wherein the pads 106 and 112 are spaced apart sufficiently to permit the overlapping strap portions to be inserted therebetween.

After the strap has been tensioned by the tensioning mechanism 16 through reciprocation of lever 60, the lever 92 is moved clockwise from the position shown in FIG. 1, thus rocking shaft 90. An early part of the movement of lever 92 brings a high portion of cam 88 into engagement with the arm 86 of slide 82 to cause the cutter 20 to cut the tensioned strap from the supply, as previously described. Further movement of lever 92 brings the low portion of cam 164 into alignment with follower 162 of shifter member 148 whereby spring 134 is permitted to move the collar member 132 downward. Since the only thing holding the device 107 in the position shown in FIG. 2 is the retainer 140, said device moves downward with the collar member, at first under only the force of gravity. Balls 138 are smaller in diameter than the distance between the closed ends (top as viewed in FIG. 2) of their sockets 136 and the top of portion 108 of the device 107 when the device is being supported by retainer 140 so that when pad 112 contacts the strap, collar member 132 continues its downward movement to force the closed ends of sockets 136 against the balls whereby the force of spring 134 is able to act against the device 107 and press the overlapping strap ends together. With balls 138 squeezed tightly between the collar member and the portion 108 of the device 107, the bottom of the portion 108 is no longer in contact with the underlying flange 146 of the retainer and thus said device is free to proceed with its orbital movement when motor 116 is started. It is to be noted that the squeezing together of the overlapping strap portions does not impose a thrust on the drive shaft 114 of the motor, the thrust being transmitted through the balls 138 and collar member 132 with the balls serving an anti-friction means between the collar member and device 107.

In the form of tool shown, motor 116 is electric and its operation is controlled by a micro-switch 166 and a suitable timer 168. Since timer 168 may take any one of a number of different specific commercially available forms it is not believed necessary to show the same in detail and only the casing of the timer is shown as mounted on top of motor 116. Micro-switch 166 is mounted on base 10 in the path of movement of lever 92 whereby continued movement of said lever after the overlapping strap portions are squeezed between the pads 106 and 112 brings the lever into contact with the micro-switch to operate the same and start the timer and the motor. Operation of the motor of course causes the upper strap portion which is in contact with pad 112 to be rubbed against the lower strap portion in the manner previously described. After the time predetermined by timer 168 the motor stops even though lever 92 remains in contact with and continues to hold the micro-switch closed. The strap ends fuse together in an extremely short time after the motor stops, whereupon the lever 92 is returned to its home position shown in FIG. 1, thereby restoring the sealing head 18 to its elevated position. Lever 60 is then rocked counterclockwise beyond the position shown in FIG. 1 to lift holding dog 12 and tensioning wheel 32 from engagement with the strap, as previously described. The tool is then easily slipped sideways to free it from the sealed and tensioned strap.

Having thus described a preferred embodiment of the invention, what is claimed is:

1. Apparatus for friction welding overlapping ends of plastic strapping comprising an anvil for supporting one end of a length of strapping which is overlapped by another portion of strapping, a support for said anvil, means mounting said anvil on said support, said means permitting a limited amount of movement of said anvil relative to said support, a device movable toward and away from said anvil, resilient means urging said device toward said anvil so as to squeeze the overlapping strap portions therebetween, means independent of said yieldable means for imparting an orbital movement to said device when it is squeezingly pressed against the overlapping strap portions, the center of motion of the orbital movement being located approximately in alignment with the longitudinal center line of the overlapping strap portions, said device and said anvil having strap engaging means of such character that the resistance to slipping between the strap engaging means and the strap is greater than between the squeezed together portions of the strap whereby orbital movement of said device causes the squeezed together strap portions to slip on one another, and anti-friction thrust bearing means between said resilient means and said device for transmitting pressure therebetween without impeding the orbital movement of said device.

2. The apparatus set forth in claim 1 wherein said strap engaging means comprise pads formed of a polyurethane elastomer, whereby the apparatus is particularly adaptable for use with polypropylene strapping.

3. The apparatus set forth in claim 1 comprising a support for said anvil, said support having a conical recess therein, said anvil having a spherical segment extending into said conical recess, resilient means normally holding the spherical segment of said anvil out of contact with said conical recess, said resilient means permitting a limited rocking movement of said anvil before the spherical segment thereof seats against the conical recess.

References Cited

UNITED STATES PATENTS

| | | | |
|---|---|---|---|
| 3,442,732 | 5/1969 | Stensaker et al. | 156—580X |
| 3,442,733 | 5/1969 | Uilcins | 156—580X |
| 3,442,734 | 5/1969 | Ericsson | 156—580X |
| 3,442,735 | 5/1969 | Stensaker | 156—580X |

BENJAMIN A. BORCHELT, Primary Examiner

J. J. DEVITT, Assistant Examiner

U.S. Cl. X.R.

156—73; 29—470.3